United States Patent [19]  [11] 3,971,671
Duperray et al.  [45] July 27, 1976

[54] RADIOELECTROCHEMICAL ENERGY CONVERTER

[75] Inventors: Gérard Duperray, Paris; Charles Eyraud, Lyon; Gérard Lecayon, Brus sur Forges; Janine Lenoir, Chaponost, all of France

[73] Assignee: Commissariat a l'Energie Atomique, Paris, France

[22] Filed: Sept. 24, 1974

[21] Appl. No.: 508,828

[30] Foreign Application Priority Data

Sept. 28, 1973 France ............................ 73.34825

[52] U.S. Cl. ............................ 136/86 R; 136/86 C
[51] Int. Cl.² ...................... H01M 8/18; H01M 8/20
[58] Field of Search ...................... 136/86 R, 86 C

[56] References Cited
UNITED STATES PATENTS
3,255,046  6/1966  Ghormley ...................... 136/86 R

*Primary Examiner*—John H. Mack
*Assistant Examiner*—H. A. Feeley
*Attorney, Agent, or Firm*—Lane, Aitken, Dunner & Ziems

[57] ABSTRACT

The energy converter utilizes the products of radiolysis of an aqueous solution of an oxidation-reduction pair and comprises a leak-tight jacket initially filled with a pure gas which is identical with the gas evolved as a result of radiolysis. A porous electrode impregnated with the aqueous solution of the oxidation-reduction pair and specific to the reaction of this latter is placed within the jacket. The converter also comprises a gas electrode which is specific to the gas evolved as a result of radiolysis, a porous diaphragm for effecting the ionic junction between the two electrodes by gas/liquid surface conductivity and means for connecting the electrodes to an external circuit.

13 Claims, 3 Drawing Figures

RADIOELECTROCHEMICAL ENERGY CONVERTER

This invention relates to a radioelectrochemical energy converter which utilizes the products of radiolysis of an aqueous solution of an oxidation-reduction pair.

It is known that an aqueous solution irradiated with $\gamma$-rays or with $\beta$ or $\alpha$-particles gives rise to the following radiolysis reaction:

$$H_2O \rightarrow H + OH \quad (1)$$

This reaction is followed by recombination reactions such as:

$$H + H \rightarrow H_2 \quad (2)$$

$$OH + OH \rightarrow H_2O_2 \text{ (or } H_2O + \tfrac{1}{2} O_2\text{)} \quad (3)$$

The two products obtained can be employed as fuel and oxidizer in a fuel cell. In the case of water or of a weakly acid or basic aqueous solution, the radiolytic efficiency G (number of molecules converted in respect of 100 eV absorbed) is usually of the order of 2.

It is known that the use of an aqueous solution of an oxidation-reduction system makes it possible to promote certain secondary reactions. Thus it follows, for example, that in the case of an oxidation-reduction system $Fe^{2+}/Fe^{3+}$ in a de-aerated acid solution, the radiolytic efficiency G ($Fe^{3+}$) which is obtained is of the order of 8.2. The permitted secondary reactions are as follows:

$$H + H^+ \rightarrow H_2^+ \quad (4)$$

$$H_2^+ + Fe^{2+} \rightarrow H_2 + Fe^{3+} \quad (5)$$

$$OH + OH \rightarrow H_2O_2 \quad (6)$$

$$H_2O_2 + 2H^+ + 2Fe^{2+} \rightarrow 2H_2O + 2Fe^{3+} \quad (7)$$

$$OH + H^+ + Fe^{2+} \rightarrow H_2O + Fe^{3+} \quad (8)$$

If there is placed in a system of this type a selective electrode for the hydrogen oxidation reaction:

$$\tfrac{1}{2} H_2 \rightarrow H^+ + e^- \quad (9)$$

and a selective electrode for the ferric ion reduction reaction:

$$Fe^{3+} + e^- \rightarrow Fe^{2+} \quad (10)$$

the reagents are regenerated in accordance with the general reaction:

$$Fe^{3+} + \tfrac{1}{2} H_2 \rightarrow Fe^{2+} + H^+ \quad (11)$$

with production of electrical energy.

By way of example, the specific electrode of reaction (10) can be made of graphite as this material has the advantage of being insensitive to the presence of $H_2$ and of H. On the other hand, the fabrication of a specific electrode for the oxidation reaction (9) is a more difficult matter: in point of fact, good catalysts for reaction (9) are the metals of the platinum family and these are subject to a drawback in that they also promote the reduction of $Fe^{3+}$ by $H_2$. This results in reduced power consumption and the anode also acquires a potential which is lower than that of a hydrogen electrode. There will therefore take place at the anode a recombination which will not supply electrons to the external circuit, thus giving rise to losses both of current and voltage.

The precise aim of this invention is to provide a novel radioelectrochemical energy converter which overcomes the disadvantages recalled in the foregoing and the operation of which is ensured with good radioelectrolytic efficiency and good power efficiency. Moreover, the original design of the converter makes it possible as will be shown later to make use of the converter in any position and in particular on a moving body.

The radioelectrochemical energy converter in accordance with the invention is of the type which entails the use of the products of radiolysis of an aqueous solution of an oxidation-reduction pair. The converter comprises a leak-tight jacket filled as a preliminary step with a pure gas which is identical with the gas evolved as a result of radiolysis, there being placed within said jacket a porous electrode which is impregnated with the aqueous solution of the oxidation-reduction pair and specific to the reaction of said oxidation-reduction pair. The converter is characterized in that it further comprises another electrode constituted by a gas electrode which is specific to the gas evolved as a result of radiolysis and a porous diaphragm for effecting the ionic junction between said electrodes by gas/liquid surface conductivity, and means for connecting said electrodes to an external circuit.

The radioactive source for supplying products of radiolysis is placed.

either outside the converter, in which case it is a gamma-ray source;

or inside the converter in solution or in suspension in the aqueous solution of the oxidation-reduction pair or in the solid state and deposited or absorbed on one of the constituent portions of the converter (electrode, diaphragm, wall). In this case, the radioactive source can be constituted by a $\gamma$-ray source or by an $\alpha$-emitter such as, for example, curium-244 (E = 5.8 MeV, T = 17.6 years) or plutonium-238 (E = 5.5 MeV, T = 86.4 years) or alternatively by a $\beta$-emitter such as tritium (E = 18.6 kev, T = 12.26 years).

The oxidation-reduction pair can be constituted for example by a system such as the following systems $Fe^{2+}/Fe^{3+}$, $U^{4+}/U^{6+}$, $H_2PO_3^-/H_2PO_4^-$, $Ce^{4+}/Ce^{3+}$, $V^{5+}/V^{4+}$. The gas electrode consists of a hydrogen electrode or of an oxygen electrode, depending on the nature of the oxidation-reduction system employed. In consequence, the porous electrode impregnated with electrolyte is either positive or negative according to the nature of the gas evolved as a result of radiolysis.

A clearer understanding of the invention will be obtained from the following description of two forms of construction of the converter in accordance with the invention, reference being made to the accompanying drawings in which FIG. 1 is a diagramatic cross-sectional view of one form of the converter of the present invention.

Figure 1:
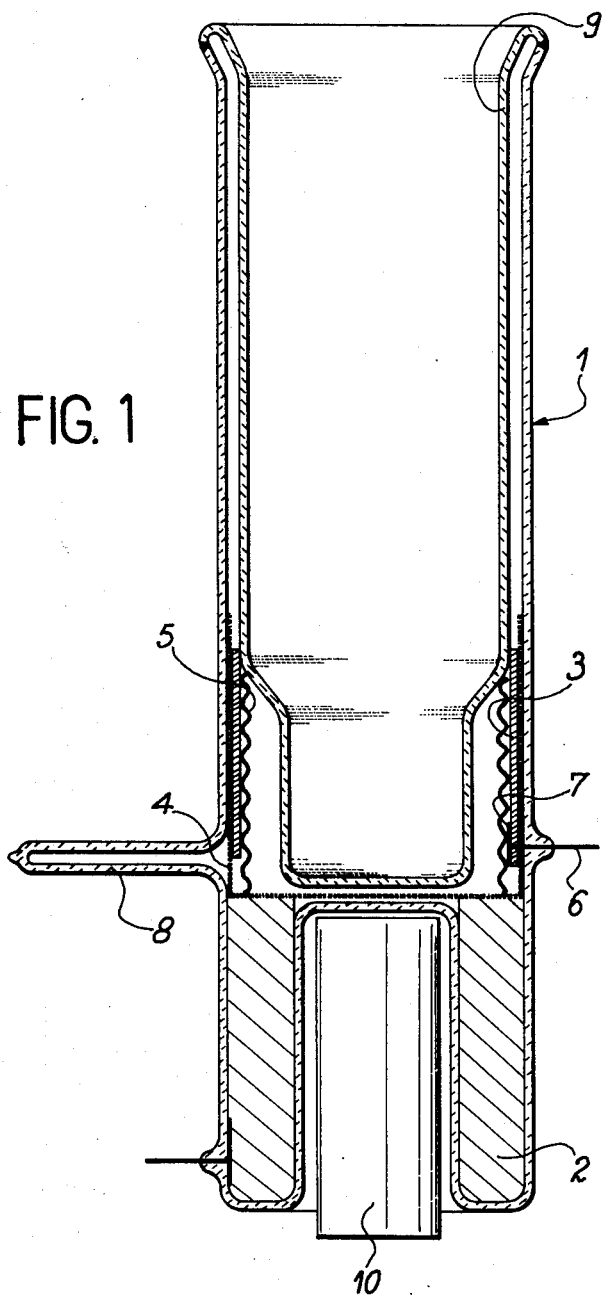

The embodiment of FIG. 1 essentially comprises a jacket 1 of glass, ceramic material, vitrified or enamelled metal for example, in which are placed a porous electrode 2 impregnated with electrolyte (said electrode 2 can also be cylindrical) and a porous electrode 3 in the form of a cylindrical sleeve. The device also comprises a diaphragm 4 placed between the two electrodes and constituted by a porous wall in the form of a cylindrical cup, the base of which rests on the top face of the electrode 2; said porous wall is made of ceramic material or glass fiber. The cylindrical electrode 3 is applied by means of an insulating spacer guide 5 against the diaphragm 4 which is in turn applied against the internal wall of the jacket 1. The connections of the electrodes 2 and 3 to an external circuit are provided by platinum lead-in wires 6 connected to the electrodes 2 and 3 by means of fine gold foil elements 7, the design function of which is to reduce contact resistances. The creation of a vacuum as well as the introduction of electrolyte and of gas which is identical with the gas subsequently evolved as a result of radiolysis are carried out through the exhaust tube 8.

In order to seal the element and to reduce the dead space, a cylinder 9 of glass for example is inserted into the interior of the cylindrical jacket 1 and the top edges of the concentric tubes are welded at a distance such that the different portions of the converter are not damaged by the heat evolved at the time of the sealing operation.

In the embodiment shown in FIG. 1, the source 10 which is intended to induce radiolysis is placed outside the jacket 1. As stated earlier, said source can also be placed inside the jacket 1.

A better understanding of the advantages provided by the particular arrangements of the converter in accordance with the invention will be gained from the following description of two examples of application of the converter under consideration, these examples being given without any limitation being implied. Example 1 relates to utilization of radiolysis of a $Fe^{2+}/Fe^{3+}$ system by a $\gamma$-ray source placed outside the converter. Example 2 relates to utilization of radiolysis of a $Fe^{2+}/Fe^{3+}$ system by a $\beta$-ray source which is placed in solution in the electrolyte.

Example I

In this example, the electrolyte is constituted by a 0.8N solution of sulphuric acid and 0.1N to 0.5N of ferrous ions. In this case the electrode 2 performs the function of cathode and is made of porous graphite. The electrode 3 performs the function of anode and is of porous material combined with palladium, rhodium or platinum. The cell is filled with hydrogen as a preliminary step.

The electrolyte is retained by capillarity, a very high proportion being retained in the cathode and a low proportion being retained in the diaphragm and the anode. The electrolyte receives the $\gamma$-radiation from the source 10 consisting of a cobalt-60 or caesium-137 source placed externally of the converter.

In the case of a weight of electrolyte of 15 grams and a dose rate of 0.12 Mrad/hr$^{-1}$, an intensity of 1.9 mA at 0.510 V is obtained. The energy efficiency $\eta$ obtained (ratio of electrical energy delivered to the energy dissipated by the radiation within the mass of the electrolyte) is 2.2 percent.

Figure 2:
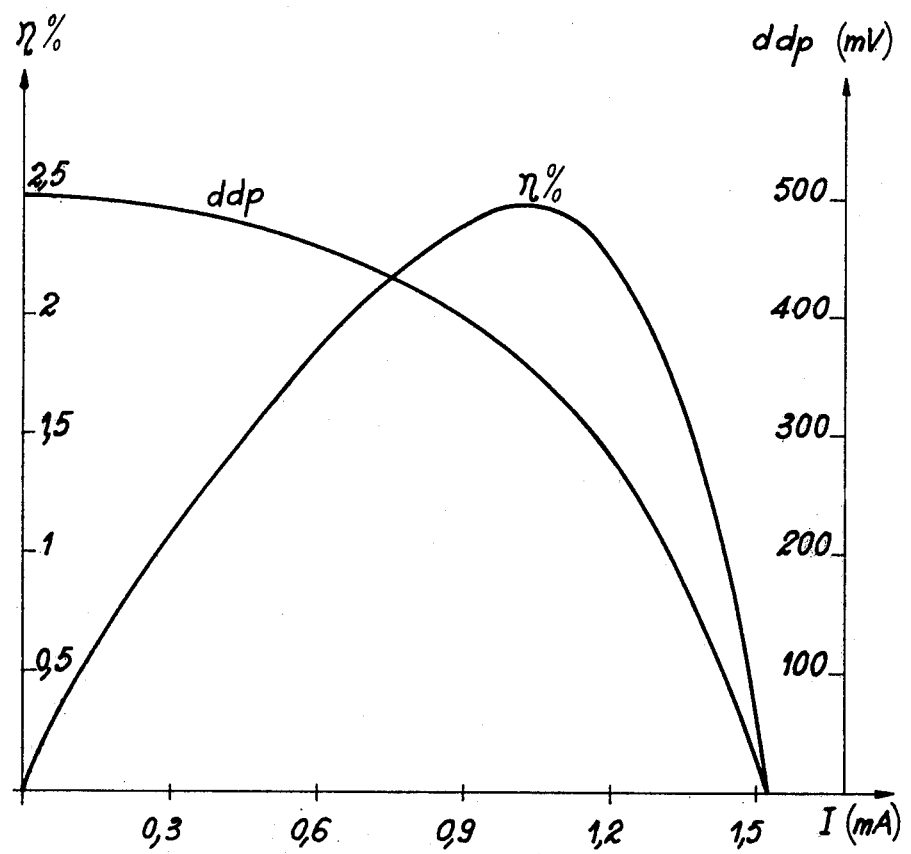
FIG. 2 is a graph indicating the current-voltage relationship utilizing the converter of FIG. 1.

This value is deduced from the I-V characteristic represented in the accompanying FIG. 2 and obtained by varying the load resistance. There is deduced from this latter the energy efficiency $\eta$ as a function of the current intensity. The short-circuit intensity makes it possible to define a maximum effective radioelectrochemical efficiency $G\ eff = 10.3\ e/100\ eV$.

It is apparent that the radioelectrochemical efficiency is distinctly improved in comparison with the efficiency obtained in the prior art.

This example points up the extremely numerous advantages of the converter in accordance with the invention. Thus it follows that:

1. by virtue of the fact that the cathode of porous structure is impregnated with electrolyte, practically the entire quantity of electrolyte is maintained in the vicinity of the cathode under the action of capillarity. The anode and cathode compartments are therefore well separated. This results in low cathode polarization of concentration; in fact, practically the whole quantity of ferric ions produced by radiolysis is formed in the immediate vicinity of the cathode: there is therefore no abrupt increase in the concentration of $Fe^{3+}$ ions and consequently no voltage drop.

2. the ionic conductivity between the anode and cathode compartments as ensured by means of the porous diaphragm permits surface conductivity without any capillary condensate or at least with a very limited volume of condensate. In the diaphragm, the ionic conductivity is mainly ensured by the protons, the ratio of the diffusion coefficients of the $H^+$ and $Fe^{3+}$ ions being in the vicinity of 20. Thus the hydrogen produced by radiolysis is given off by the porous mass which constitutes the cathode and passes freely in the gas phase into the anode compartment in which it is consumed.

3. the fact that the jacket which constitutes the converter is hermetically sealed makes it possible to prevent any out-leakage of hydrogen and any admission of inert gas or oxygen. This makes it possible in addition to ensure confinement of the radioactive source in the event that this latter is located inside the converter.

4. by virtue of the fact that the converter is initially filled with hydrogen, the anode potential is very close to that of a hydrogen electrode, the more so as the hydrogen pressure is higher and the ferric ion concentration is lower at the outset. The electromotive force obtained is therefore close to the theoretical value of that of a reference pile of the same type.

5. the two electrodes are not immersed in a solution of electrolyte. In the converter according to the invention, this solution impregnates the first electrode and the diaphragm which are both porous; and if the converter is mounted on a moving body, displacements and disturbances of operation which are liable to arise need no longer be anticipated by reason of the adsorption of this solution. This original feature makes it possible to mount the converter on a moving body such as, for example, the carrier of a heart assistance device or a vehicle.

Example II

This example relates to the case in which the radioactive source is located inside the converter in accordance with the invention.

The source is constituted by tritium dissolved in the same electrolyte as in Example I. By placing within the device 2.5 cm$^3$ of electrolyte charged with tritium to 30 ci/cm$^{-3}$, namely a dose rate within the electrolyte of the order of 0.40 Mrad/hr$^{-1}$, there is obtained an intensity of 55 $\mu$A at 0.57 volt, namely a power of 28 $\mu$W, that is to say an energy efficiency $\eta$ of the order of 1 percent.

Figure 3:
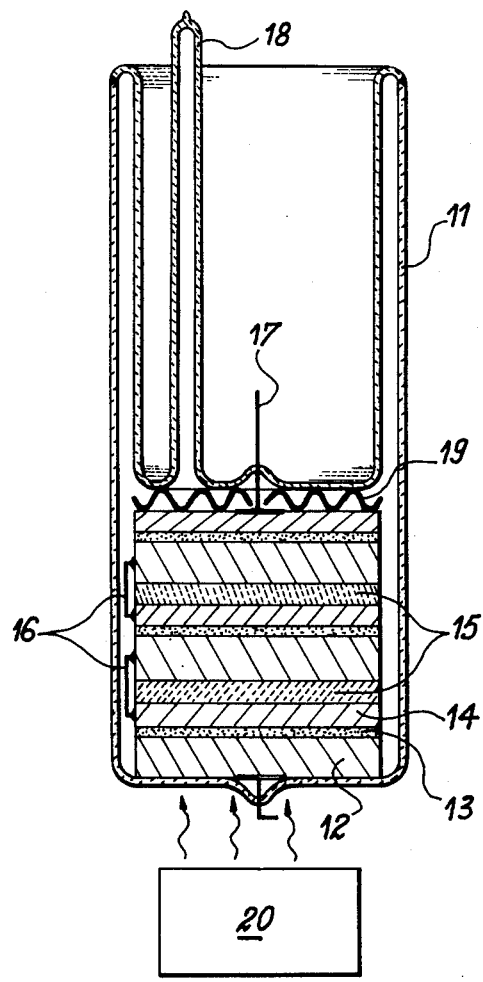
FIG. 3 is a view similar to FIG. 1 but depicting an alternate embodiment of the converter of the present invention.

The converter in accordance with the invention can advantageously be employed for the construction of a bank of elements in series of the type shown in the accompanying FIG. 3. There is employed in this case a converter having a cathode of cylindrical shape, the radiation source 20 being placed outside the converter. The different elements are placed within a jacket 11 in which are placed successively the cathodes 12, the diaphragms 13, the anodes 14, each series of elements being separated by a glass partition 15. Series connections 16 serve to couple each cathode 13 with the anode 14 of the preceding element. The terminal cathode and anode are connected to an external circuit by means of leads 17. The creation of a vacuum as well as the introduction of electrolyte and of gas which is identical with the gas subsequently evolved as a result of radiolysis are performed by means of the exhaust tube 18. An insulating spacer guide 19 placed between the upper anode and the internal wall of the jacket 11 ensures that the complete assembly is put in compression against the bottom end-wall of the jacket 11.

By employing exactly the same electrolyte as that of Example I, it is found that four elements connected in series in the manner described in the foregoing deliver a voltage of approximately 1 volt. This makes it possible to obtain the usual standardized voltages: 1 volt, 6 volts, 12 volts, and so forth.

The radioelectrochemical energy converter in accordance with the invention is of special interest for the purpose of obtaining low values of electric power of the order of 1 microwatt to 1 watt. The converter under consideration is reliable and its efficiency is competitive or higher than that of converters which utilize heat in the conversion cycle such as thermoelectrical or thermoelectronic converters.

The converter in accordance with the invention can be employed in particular for the supply of power to sea or land beacons of the ultrasonic or radiowave type, to detonators, clock mechanisms, implantable stimulators such as heart pacemakers, for example, etc. The converter can also constitute a reference source in microelectronics.

Finally, the converter in accordance with the invention, when used alone without a radioactive emitter, can be employed as an instrument for measuring the dose rate of X-ray or γ-ray sources.

What we claim is:

1. A radioelectrochemical energy converter which utilizes the products of radiolysis of an aqueous solution of an oxidation-reduction pair, said converter comprising a leaktight jacket adapted to be disposed in a cooperative relationship with a source of radiant energy, said jacket being filled with a pure gas which is identical with the gas evolved as a result of said radiolysis, a porous electrode disposed within said jacket and adapted to communicate with said energy source, said electrode being impregnated with said aqueous solution of said oxidation-reduction pair and being specific to the reaction of said oxidation-reduction pair, a gas electrode free from said solution and specific to the gas evolved as a result of said radiolysis, a porous diaphragm for effecting ionic conductivity between said electrodes, and means for connecting said electrodes to an external circuit.

2. A converter according to claim 1, wherein the radioactive source for supplying the products of radiolysis is placed outside said converter.

3. A converter according to claim 1, wherein the radioactive source is in solution or in suspension in the aqueous solution of the oxidation-reduction pair.

4. A converter according to claim 1, wherein the radioactive source is in the solid state and deposited or absorbed on one of the constituent portions of the converter.

5. A converter according to claim 2, wherein the source is constituted by a γ-ray source.

6. A converter according to claim 3, wherein the source is constituted by a source of rays selected from the group comprising the α, β, γ rays.

7. A converter according to claim 5, wherein the γ-ray source is selected from the group comprising cobalt-60, caesium-137.

8. A converter according to claim 6, wherein the α-ray source is selected from the group comprising curium-244, plutonium-238.

9. A converter according to claim 6, wherein the β-ray source is constituted by tritium.

10. A converter according to claim 1, wherein the oxidation-reduction pair is selected from the group comprising the following pairs $Fe^{2+}/Fe^{3+}$, $U^{4+}/U^{6+}$, $H_2PO_2^-/H_2PO_4^-$, $Ce^{4+}/Ce^{3+}$, $V^{5+}/V^{4+}$.

11. A converter according to claim 1, wherein the gas electrode is constituted by a hydrogen electrode.

12. A converter according to claim 1, wherein the gas electrode is constituted by an oxygen electrode.

13. An application of the converter according to claim 1 to the construction of a bank of elements in series, wherein each element is constituted by said converter.

* * * * *